April 20, 1954 W. E. KUEHLING 2,675,787
FLUID METER
Filed May 20, 1949 3 Sheets-Sheet 1
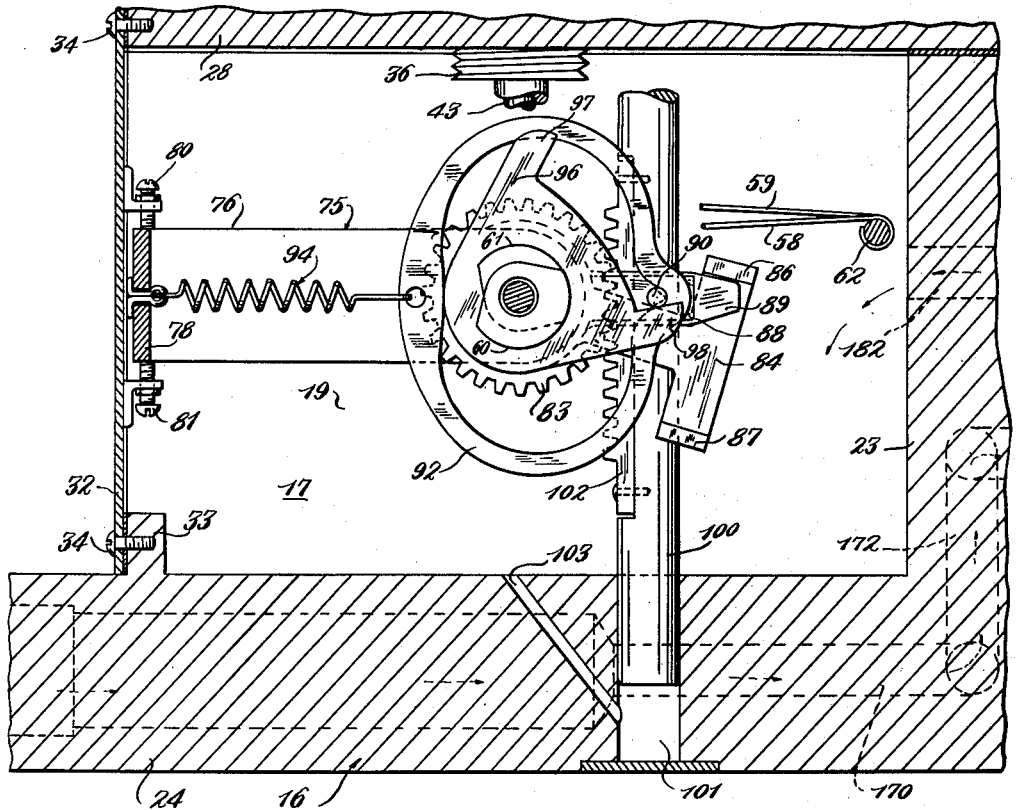
Fig. 6
Fig. 8
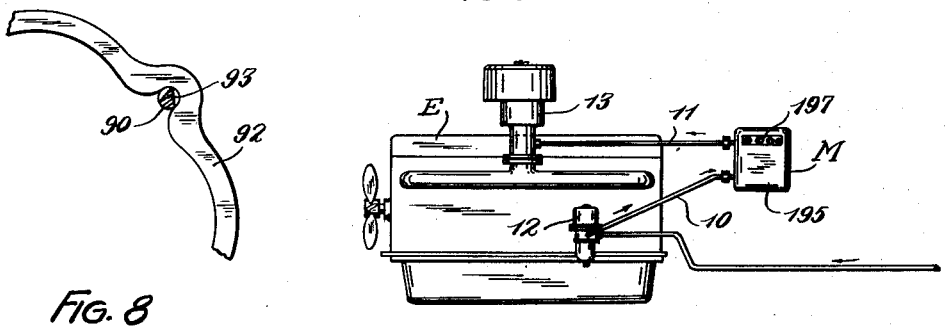
Fig. 1
INVENTOR.
WILLIAM E. KUEHLING
BY
Hudson, Boughton,
Williams, David & Hoffmann
ATTORNEYS April 20, 1954  W. E. KUEHLING  2,675,787
FLUID METER
Filed May 20, 1949  3 Sheets-Sheet 2

INVENTOR.
WILLIAM E. KUEHLING
BY Hudson, Boughton,
Williams, David & Hoffmann
ATTORNEYS April 20, 1954   W. E. KUEHLING   2,675,787
FLUID METER Filed May 20, 1949   3 Sheets-Sheet 3

INVENTOR.
WILLIAM E. KUEHLING
BY Hudson, Boughton,
Williams, David & Hoffmann.
ATTORNEYS Patented Apr. 20, 1954

2,675,787

UNITED STATES PATENT OFFICE 2,675,787

FLUID METER

William E. Kuehling, Cleveland, Ohio

Application May 20, 1949, Serial No. 94,475

9 Claims. (Cl. 121—164)

The present invention relates to a liquid fuel meter for registering the quantity of fuel consumed by an internal combustion engine.

The present invention is directed to a liquid fuel meter of the type which includes a measuring chamber having a movable wall therein and intake and exhaust valves for admitting and exhausting liquid fuel to and from the chamber, respectively, and an object of the invention is to provide a novel and improved meter of this type of such construction that fuel cannot by-pass the measuring chamber by leakage thereof between the inlet and outlet passages.

More specifically, an object of the invention is to provide a novel and improved liquid fuel meter of the type referred to having the intake valves and exhaust valves mounted in separate compartments adjacent to the measuring chamber and the valves in each compartment being actuated by a reciprocating member which is connected with the movable wall in the measuring chamber and extends into the valve compartment.

Another object of the invention is to provide a novel and improved liquid fuel meter of the type referred to hereinbefore, in which the intake and exhaust valves are operated by individual snap actuating mechanisms.

A further object of the invention is to provide a novel and improved liquid fuel meter for connection in a fuel line leading from the fuel pump to the carburetor of an internal combustion engine, which meter includes mechanism responsive to the presence of liquid at the intake of the meter and operable to divert gas, passing through the fuel line, from the intake of the meter.

A still further object of the invention is to provide a novel and improved liquid fuel meter for connection in a fuel line leading from the fuel pump to the carburetor of an internal combustion engine, which meter includes mechanism responsive to liquid at the intake of the meter and operable to maintain the intake of the meter closed until a predetermined quantity of liquid fuel is available at the intake and to vent to fuel line adjacent to the intake of the meter while the intake is closed by the mechanism.

Other objects and advantages of the invention will be apparent from the following description of a preferred form of the invention, reference being made to the accompanying drawings wherein Fig. 1 is a diagrammatic illustration of an internal combustion engine having a fuel meter connected therewith;

Fig. 6 is a view similar to that of Fig. 5 but showing certain parts in different positions and including additional structure not shown in Fig. 5;

Fig. 8 is a fragmentary view taken along line 8—8 of Fig. 7; and

In general, the invention contemplates a liquid fuel meter comprising a measuring chamber having a movable, oscillatable wall which is adapted to actuate a registering mechanism. The fuel to be measured is directed to and from the chamber through inlet and outlet valve mechanisms which are actuated in synchronism to cause the fuel to oscillate the wall of the chamber. The inlet and outlet valves are disposed in separate compartments and are independently actuated by the movable wall of the chamber through individual reciprocable members which project into the respective compartments through openings between the chamber and the respective compartments. In the preferred form of the invention, the valves are actuated by snap acting mechanisms. The passage of fuel through the meter is controlled by a float valve structure comprising a float which is responsive to fluid directed to the inlet of the meter, and two valves are arranged to be actuated according to the position of the float. One valve controls the flow of fuel to the meter inlet and when the float is lowered, due to the absence of liquid in the fuel line, the valve is closed and when the float is raised to a predetermined position, the valve is opened. The second valve controls a vent opening to the atmosphere and is opened by the float when the float is in its lower position and closed when the float is raised. By this arrangement, the meter cannot be made to render a false reading by passing air or other gas through the fuel line of the engine. The vent control prevents formation of an air lock in the float valve structure.

The meter is particularly suitable for use on trucks, busses, and the like, powered by gasoline or diesel oil fuel burning internal combustion engines, but for purposes of illustrating the invention, I have shown a fuel meter M which is connected in the fuel line 10, 11 of a gasoline operated internal combustion engine E, intermediate the fuel pump 12 and carburetor 13 so that the meter may register the amount of gasoline consumed by the engine.

Figure 3:
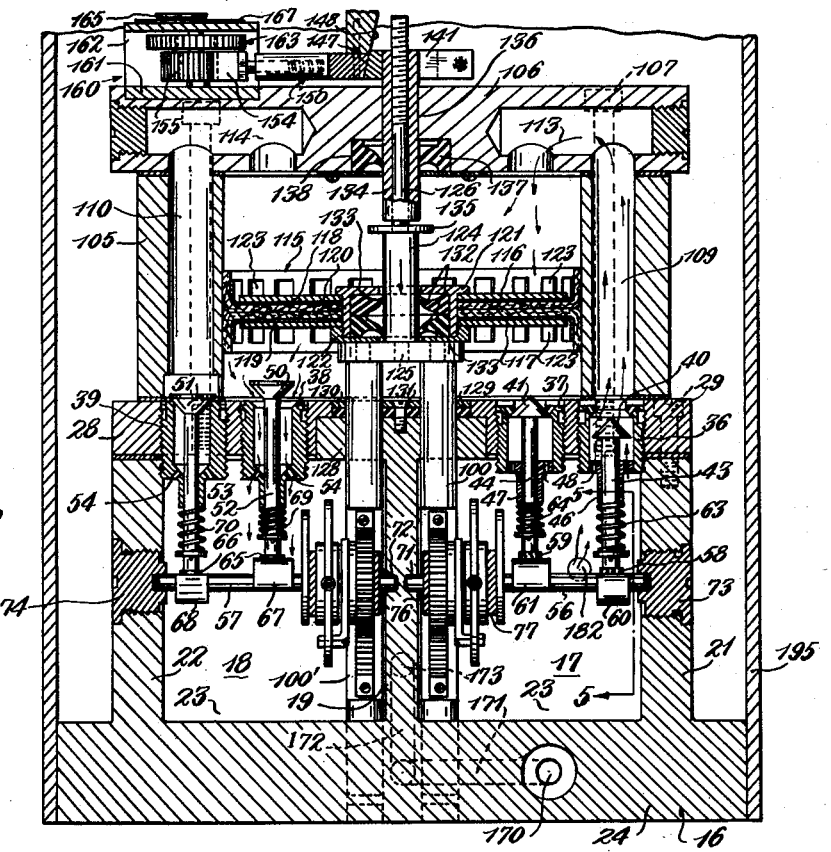
Fig. 3 is a sectional view taken substantially along line 3—3 of Figure 2 and rotated 90° counterclockwise from the showing of Fig. 2.

The meter M comprises a body member 16 having a pair of compartments 17, 18 formed therein, which compartments are separated by a wall 19. The compartment 17 forms a fuel inlet for the meter and the compartment 18 forms a fuel outlet and the latter includes an outlet passage 20 bored in a wall 24. Preferably, the member 16 is of cast metal, such as aluminum, and the wall 19 as well as walls 21, 22, 23 are cast integral with the relatively thick backing wall 24. The tops of the compartments 17, 18 as viewed in Figs. 3 and 6, are closed by a plate 28 attached to the edges of walls 21, 22, 23 by bolts 29, only one of which appears in the drawing, and the fronts of the compartments are closed by a plate 32 attached to the edge of plate 28 and a lip 33, which extends transversely of the compartments, by screws 34. Suitable gaskets are interposed between the plates 28, 32 and the respective chamber walls to prevent leakage of gasoline or other fuel from the chambers.

The plate 28 has four threaded openings therethrough into which valve seat members 36, 37, 38, 39 are threaded. Preferably, a suitable compound is spread on the threads of the valve seat members before insertion in the plate 28 for forming a seal between the cooperating threads. The members 36, 37 have internal tapered seats adapted to receive conical valve members 40, 41, respectively, which valve members include stems 43, 44, respectively. The stems 43, 44 slide in guides 46, 47 threaded into the respective valve seat members, and the guides have a plurality of fuel passages 48 therethrough. The valve seat members 38, 39 have external tapered seats for receiving poppet type valve members 50, 51, respectively, which members include stems 52, 53, respectively, which extend through tubular guide formations in the valve seat members. The valve seat members have fuel passages 54 formed therein adjacent the valve stem guide portions thereof.

The valves 40, 41 are actuated by a camshaft 56 and valves 50, 51 are actuated by a camshaft 57. The ends of valve stems 43, 44 rest on hook shaped springs 58, 59 which in turn ride cam lobes 60, 61 and which springs are anchored on a pin 62 secured between walls 19, 21. Compression springs 63, 64 acting between the guides 46, 47 and washers pinned to the valve stems, urge the valve stems toward the cam lobes but the tension of springs 63, 64 is less than that of the springs 58, 59. The springs 58, 59 form cushions between the cam lobes and valve stems to cause the valves to seat firmly without the necessity of extreme precision in the cam throws. The valve stems 52, 53 rest on flat strips 65, 66 which ride on cam lobes 67, 68, respectively, and the stems are urged to the strips by compression springs 69, 70, acting between the valve seat members 38, 39 and washers pinned to the valve stems. The strips 65, 66 are similar to the springs 58, 59 to the extent that they are attached to a pin, not shown, and serve to move the valve stems without imparting a lateral component of force thereto as would the case if the stems rode directly on the rotatable cam lobes.

Figures 5, 7:
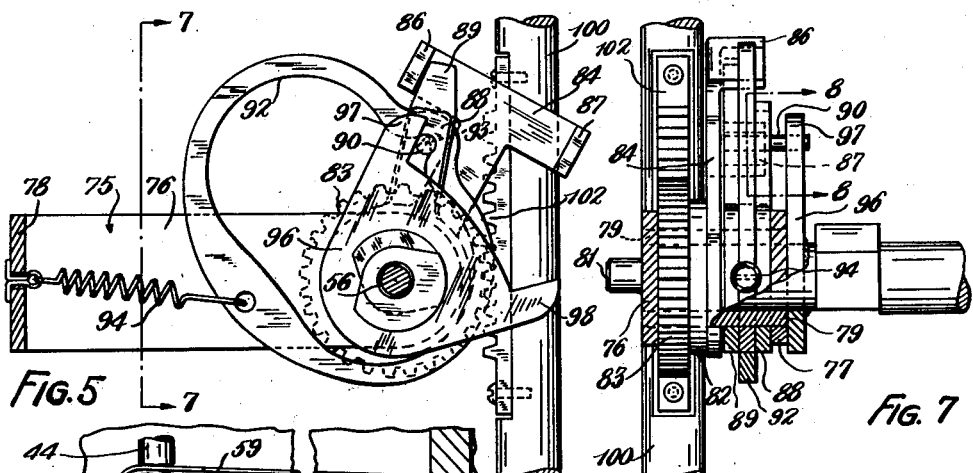
Fig. 5 is a view taken substantially along line 5—5 of Fig. 3, but on a larger scale and omitting certain parts.
Fig. 7 is a sectional view taken along line 7—7 of Fig. 5.
Figure 9:
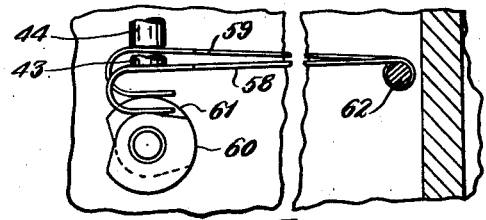
Fig. 9 is a fragmentary view showing certain parts omitted in Figs. 5 and 6.

The camshafts 56, 57 are journalled at their inner ends in openings 71, 72 in wall 19 and their outer ends are journalled in bushings 73, 74 threaded into openings through walls 21, 22. The camshafts are each oscillated with a snap action by individual mechanisms which are of like construction but which operate independently of one another. Referring more specifically to Figs. 5, 6 and 7 wherein the mechanism for oscillating camshaft 56 is shown in detail, the mechanism comprises a U-shaped bracket 75 having two parallel legs 76, 77 and a yoke 78. The outer ends of legs 76, 77 have aligned openings into which a bushing 79 is secured and the bushing is adapted to receive the camshaft 56 therethrough. The yoke end of the bracket 75 is confined between adjustable stop screws 80, 81, which are threaded in brackets attached to plate 32 and which engage the top and bottom edges of the yoke 78, respectively. An actuator 82 is rotatably supported on the bushing 79 and the actuator includes a pinion gear 83 by which the actuator is rotated. The actuator also includes a T-shaped arm 84 which has laterally projecting lugs 86, 87 at the ends of the cross portion thereof. A snap member comprising two spaced, parallel levers 88, 89 connected together adjacent to the free ends thereof by a pin 90, is rotatably journalled on the bushing 79, and the lever 89 projects beyond lever 88 and is adapted to be engaged by either of the lugs 86, 87 of the actuator 82. The lugs 86, 87 form a lost motion connection between the actuator and the snap member by which the latter is free to travel through a limited angle. A generally oval shape member 92, loosely surrounds the bushing 79 and extends between the levers 88, 89 and engages pin 90. The portion of the member 92 engaging the pin 90 is recessed and the portion of the pin in engagement with the member 92 has a knife edge, as seen at 93. A tension spring 94 is attached at one end to member 92 and the other end is attached to the yoke 78, and the tension of the spring, acting through member 92, urges the actuator 82 about the bushing 79 in one direction or the other, depending upon which side of the line of tension of the spring the pin 90 is positioned. A generally triangular plate 96 is attached to the camshaft 56, as by brazing, and the plate includes ears 97, 98 between which the pin 90 extends and engages one ear or the other to oscillate the camshaft 56 through the plate 96. The ears 97, 98 form angularly spaced stops on the camshaft which are alternately engaged by the pin 90.

The valve actuating mechanism is operated by a plunger 100 which extends through an opening in wall 28 and into a socket 101 in wall 24. A gear rack 102 is attached to the plunger and meshes with the gear 83 to rotate the gear in opposite directions as the plunger is reciprocated. A breather passage 103 is drilled in wall 24 leading to the inner end of socket 101 to permit free reciprocation of the plunger in the socket.

When the parts of the valve actuating mechanism are in the positions shown in Fig. 5, valve 40 is open and valve 41 is closed. As plunger 100 is lowered, arm 84 is rotated clockwise, moving levers 88, 89 and pin 90 therewith but without changing the position of camshaft 56 as pin 90 moves freely from ear 97 toward ear 98 of plate 96. At approximately the instant pin 90 engages ear 98, the pivot point of pin 90 with member 92 is aligned with the line of tension of spring 94 and a state of equilibrium is in effect so far as the action of the spring on the pin is concerned, or otherwise stated, the snap member comprising levers 88, 89 is on dead center. As the pin 90 is moved below this line of tension, however, the spring quickly snaps the levers 88, 89 and pin 90 downwardly, swinging lever 89 from lug 86 to lug 87 and thereby rapidly moving the camshaft through an angle corresponding to that through which lever 89 moves when traveling between lugs 86, 87. The mechanism similarly snap actuates the camshaft in the opposite direction when plunger 100 moves upwardly. The lobes of the camshaft are so arranged that the valves are moved only during the quick, angular rotation of the cam shaft imparted thereto by the snap mechanism. By adjustably positioning the screws 80, 81 relative to the yoke 78, the dead center positions of the snap mechanism can be adjusted to cause the valve to be operated when the plunger 100 reaches predetermined positions.

The actuating mechanism for valves 50, 51 is like the mechanism described with reference to valves 40, 41 and is actuated by a plunger 100' which corresponds to plunger 100. It will be noted that the valves and their operating mechanisms in the compartment 17 operate independently of those in compartment 18 and there are no interconnecting, moving members extending from one compartment to the other.

The measuring chamber of the meter comprises a cylinder 105 which is attached to the plate 28 and closed at the other end by a plate 106. The plate 106 and cylinder 105 are secured to the plate 28 by screws 107 which extend through openings in the plate 106 and cylinder and are threaded in the plate 28. Suitable gaskets are interposed between the ends of the cylinder and the plates 28 and 106 to form a liquid tight seal. The interior of the cylinder is in registration with the valve ports formed by members 37, 38 and two bored conduits 109, 110 are provided through opposite side walls of the cylinder, one end of which conduits is in registration with the ports of valve seat members 36, 39 and the other ends of which are in registration with passages 113, 114 in the plate 106, which latter passages open into the cylinder. A piston 115 is adapted to reciprocate in the cylinder and it constitutes a movable wall of the measuring chamber. The piston comprises two flexible washers 116, 117 suitable for forming a fuel tight sliding seal with the walls of the cylinder and are preferably formed of treated leather compressed between two metal disks 118, 119 which are held together by a sleeve 120 having a flange 121 at one end and a nut 122 threaded on the other end. Preferably, finger springs 123 interposed between plates 118, 119 and washers 116, 117 urge the outer edges of the washers 116, 117 against the walls of the cylinder. A rod 124 having a transversely extending bar 125 at one end and a threaded shank portion 126 projecting from the opposite end extends through the sleeve 120. Leakage of fuel from one side of the piston to the other between the sleeve 120 and the rod 124 is prevented by a pair of seals 132, which are secured in the sleeve 120. Preferably, walls 133 are provided across the ends of the sleeve 120, which walls have openings which closely fit rod 124 to prevent tilting of the piston in the cylinder. The outer ends of the plungers 100, 100' are attached to opposite ends of the bar 125 so that the rod 124 may reciprocate the plungers and operate the valves 40, 41, 50, 51. It will be noted that the wall 19 has a laterally extending wall portion 128 having openings through which the plungers 100, 100' extend and a suitable packing member 129 is disposed between the top of wall 128 and a plate 130 which is secured to wall 128 by a screw 131. The packing member 129 has openings therethrough closely fitting the plungers to prevent passage of fuel between the cylinder and chambers 17, 18. The member 129 may be of neoprene or any other suitable material.

A sleeve 134 is threaded on shank 126 of the rod 124 and a washer 135 is interposed between the end of the rod proper and the sleeve 134. The washer 135 may freely slide longitudinally on the shank 126 and the position of the sleeve 134 on the shank determines the extent of movement of the washer. The shank 126 and sleeve 134 extend through an opening 136 through the plate 106 and an oil seal 137, pressed into an undercut recess 138 in the plate 106, prevents the escape of fuel through opening 136.

A cam member 141 is attached to the outer end of sleeve 134 and includes two jaws 142, 143 having a circular opening therebetween for receiving the sleeve 134. A screw 144 extends through an opening in one jaw and is threaded in an opening in the other jaw so that the jaws may be clamped to the sleeve by the screw. The clamping jaws not only secure the cam member to the sleeve 134 but compress the walls of the sleeve to lock the sleeve to the shank 126. The cam member 141 also includes a cam surface 147 which abuts a corresponding cam 148 attached to one end of a leg 149 of a bell crank lever 150.

The bell crank lever 150 is pivotally attached to the plate 106 by a bearing pin 151, and the leg 152 thereof has a bore therein which receives a shank 153 of a pawl 154. The pawl 154 is yieldingly urged against a ratchet wheel 155 of a volume registering device by a spring 156 in the bore and is adapted to rotate the ratchet wheel through a certain fraction of a revolution each time the bell crank lever is oscillated. In the present form of the invention, the ratchet wheel has twenty teeth thereon and the lever 150 is adapted to rotate the ratchet wheel counter-clockwise, as viewed in Fig. 2, one twentieth of a revolution for each oscillation of the lever. Movement of the sleeve 134 upwardly, as viewed in Fig. 3, causes the cam 141 to rotate lever 150 clockwise, as viewed in Fig. 2, during which movement the pawl 154 latches with a tooth of the ratchet wheel. When sleeve 134 descends, lever 150 is moved counterclockwise by a tension spring 156 connected to the leg 149. The ratchet wheel is prevented from rotating clockwise by a detent spring 157.

The registering device of which ratchet wheel 155 is a component, includes a bracket 160 attached to the plate 106. The bracket comprises a flat strip 161 and a strip 162 having spacer legs at the ends thereof which are attached to the ends of strip 161. A gear train 163, only part of which is shown, is supported by the strips 161, 162 therebetween and is adapted to drive shafts carrying pointers 165 attached to the shafts. The ratchet wheel 155 which is also supported between strips 161, 162 is secured on a shaft 166 which carries a pointer 165 and which is drivingly connected with the gear train. The gears of the gear train are such that each succeeding pointer shaft is driven one-tenth the rate of the preceding shaft. The details of the gear train for the pointer shafts are not shown as such mechanisms are well known in the art relating to registering devices. Suitable dials 167 are provided on the outer face of the strip 162 to cooperate with the pointers to indicate the number of gallons of fuel registered by the meter.

Fuel fed to the meter first passes through a float chamber 169 and the inlet to the chamber comprises bores 170, 171, 172, 173 formed in the walls 23, 24 of member 16. The float chamber includes two compartments 175, 176 and a valve seat member 177 is attached in an opening through a wall 178 of compartment 175 and a valve seat member 180 is secured in an opening through a wall 181 of the compartment 176. The valve seat member 177 is arranged to discharge into a bore 182 which empties into compartment 17. The valve seat member 180 is arranged to discharge to the atmosphere through a port in the upper part of the float chamber. The valve seat of member 177 is adapted to be closed by a valve member 183 and the seat member 180 is adapted to be closed by a valve member 184. A float 186 is attached to the free end of a lever 187 which is pivoted to a bracket 188 secured to wall 181 by member 189. The valve member 183 is connected to lever 187 by a link 190 and the connection between the valve member and link is effected by a hook 191 on the valve member which projects through an eye in the link. Valve member 184 rests on lever 187 and it will be apparent that as the float rises in the chamber, valve member 183 is moved to open valve seat of member 177, and valve member 184 is moved to close the valve seat of member 180. The reverse action of the valve members occurs when the float is lowered. By this arrangement in the event air, or other gas, was blown through the fuel line in an attempt to effect a false registration of the amount of fuel consumed, the reduction of fuel in the chamber 169 would cause the float to drop, closing the fuel inlet bore 182 and venting the chamber to the atmosphere through valve seat member 180. Preferably, the float 186 is arranged so that it does not close the air venting valve and open the fuel inlet valve until after sufficient fuel has accumulated in the float chamber to completely cover wall 178 which insures flow of liquid to the meter inlet compartment 17. Valve 184 is not closed on its valve seat until after valve 183 is removed from its seat so that an air lock cannot be formed in the chamber and prevent entrance of fuel into the chamber.

Preferably, the mechanism of the meter is enclosed in a cover 195 which is in the form of a shell open at one end to receive the wall 24 of member 16. The cover is preferably attached to the mechanism by means including a destructible seal to discourage unauthorized tampering with the mechanism. The attaching means is not shown as it may comprise any well known device for such purpose. The cover includes a window 197 in registration with the registering dials 167 so that the fuel registration can be observed without removing the cover.

Figures 2, 4:
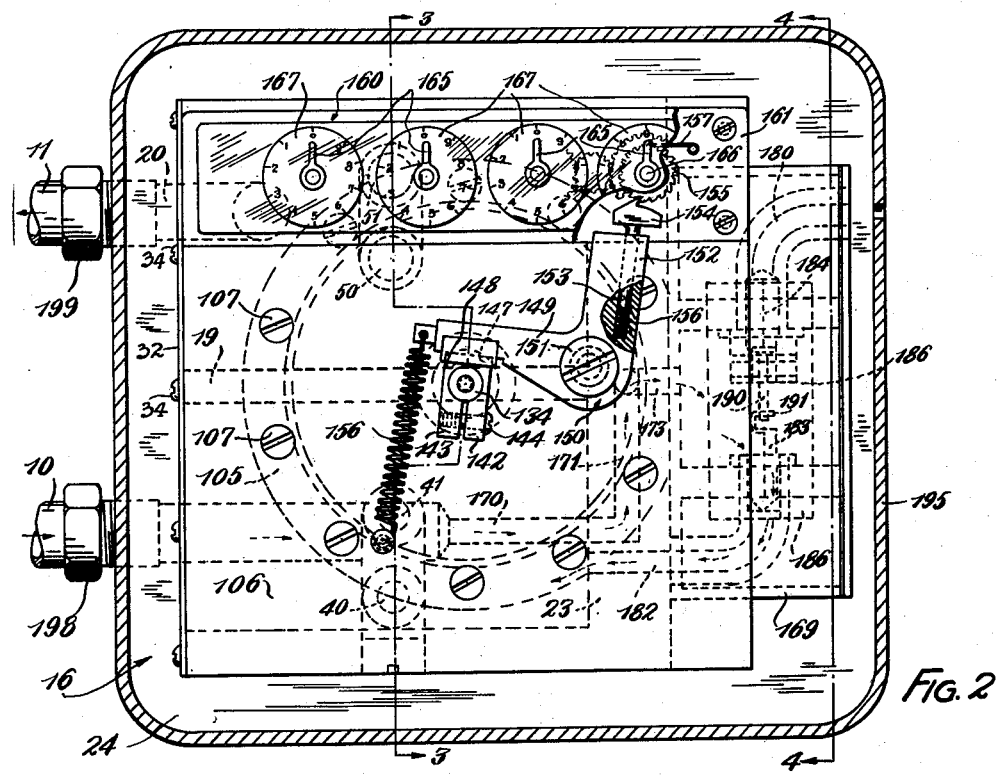
Fig. 2 is a front view of the meter having part of the cover thereof cut away and certain other parts broken away.
Fig. 4 is a fragmentary, sectional view taken substantially along line 4—4 of Fig. 2.

The meter may be mounted in any convenient location such that the float 186 may swing vertically, as is shown in Figs. 2 and 4, and the fuel line 10 from the fuel pump is connected with the inlet bore 170 by a coupling 198 and the outlet bore 20 is connected with line 11 leading to the carburetor 13 by a coupling 199.

The operation of the meter is as follows: Fuel is forced from fuel pump 12 through pipe line 10 into the inlet passage formed by bores 170, 171, 172, 173 into float chamber 169 and when sufficient fuel has been introduced into the float chamber, valve member 183 is removed from its seat permitting fuel to flow through member 177 into compartment 17 through the passage 182. Assuming that the piston 115 and valves 40, 41, 50, 51 are in the positions shown in Fig. 3, which shows the piston just before it reaches the end of its inward stroke, fuel passes valve 40, travels through passages 109, 113 and into the outer end of the cylinder, forcing the piston 115 inwardly. Fuel in the inner end of the cylinder from previous operation of the meter is exhausted through the open valve seat member 38, into compartment 18, through passage 20 to line 11 and thence to the carburetor 13. As the piston 115 moves inwardly it abuts bar 125 and moves rod 124 inwardly to operate the valve actuating mechanisms which are adjusted by proper positioning of screws 80, 81, to simultaneously reverse the positions of the valves 40, 41, 50, 51. The inward movement of rod 124 also causes pawl 154 to be moved to engage a succeeding ratchet tooth of the ratchet wheel 155. When the position of the valves are reversed, that is to say, when valves 40, 50 close and valves 41, 51 open, fuel enters the cylinder from compartment 17 through valve 41 and forces piston 115 outwardly and fuel on the outer side of the piston is exhausted through passages 114, 110, open valve seat member 39, compartment 18 and passage 20 to line 11. Piston 115 slides on rod 124 without moving the latter until it engages washer 135 and moves the latter against the end of sleeve 134. Movement of rod 124 outwardly by the piston causes the plungers 100, 100' to actuate the valve operating mechanisms and reverse the positions of the valves to effect reversal of movement of the piston. The outward movement of rod 124 causes pawl 154 to engage a tooth of the ratchet wheel 155 and rotate the latter one-twentieth of a revolution. Each stroke of the piston displaces one-half the volume of fuel registered by one-twentieth of a revolution of the ratchet wheel 155 and the meter may be calibrated to register the exact amount of fuel passing therethrough by adjusting the position of sleeve 134 on the shank 126 of rod 124. By unscrewing the sleeve on the shank it is moved outwardly and the piston 115 moves through a longer stroke before the washer 135 engages the sleeve and causes movement of rod 124. By screwing the sleeve onto the stem, the effective stroke of the piston may be reduced so that less fuel passing through the meter operates the piston.

In the form of the invention shown, the piston should displace one-fortieth of a gallon during each stroke, but it is obvious that the diameter of the piston and cylinder and the length of the stroke of the piston may be such that more or less fuel is displaced during each stroke. In such event the ratchet wheel 155 should be modified accordingly.

The construction of the meter is such that the operating members for the valve actuating mechanism reciprocate in packing glands because it has been found that this type of gland can be made leakproof against gasoline with relatively little difficulty, whereas a rotating shaft in a packing gland is apt to permit passage of gasoline through the latter. By confining the cam shafts 56, 57 to the compartments 17, 18, respectively, the problem of sealing the shafts with a supporting wall or the like is obviated.

The construction shown in the present embodiment of the invention facilitates the assembly of the meter in that the valve actuating mechanism, including the cam shafts and the plungers 100, 100' may be assembled in the member 16 and the valve seat members and the valves 40, 41, 50, 51 may be assembled in the plate 28 prior to attaching the plate to member 16.

Although I have described but one form of the invention, other forms may be adapted, all falling within the scope of the claims which follow.

Having thus described my invention, I claim:

1. In a fuel metering device, a member having a fuel inlet compartment and a fuel outlet compartment; a volumetric measuring mechanism including a cylinder having a piston reciprocable therein; means forming a fuel passageway leading from one of said compartments to the interior of said cylinder and a fuel passageway leading from said cylinder to the other of said compartments; a valve in each of said passages; individually operable snap acting mechanisms in the inlet and outlet compartments, respectively, including actuating members operatively connected with said valves, respectively; and means operatively interconnecting said piston with the respective snap acting mechanisms, the last mentioned means comprising, a forked rod having the stem thereof movable longitudinally by said piston, the tines of said rod extending into the respective compartments and operatively connected with the snap acting mechanisms.

2. In a fuel metering device, a member having a fuel inlet compartment and a fuel outlet compartment; a volumetric measuring mechanism including, means forming a chamber having a movable wall; means forming a fluid passageway leading from one of said compartments to the interior of said chamber and a fluid passageway leading from said chamber to the other of said compartments; a valve in each of said passages; two individually operable snap mechanisms in said inlet and outlet compartments, respectively, including actuating members operatively connected with said valves, respectively; and means operatively interconnecting said movable wall with the respective snap mechanisms, the last mentioned means comprising a forked rod having the stem thereof movable longitudinally by said piston, the tines of said rod extending into the respective compartments and operatively connected with the snap acting mechanisms.

3. In a fuel metering device, a member having a fuel inlet compartment and a fuel outlet compartment; a volumetric measuring mechanism including, means forming a chamber having a movable wall; means forming a fluid passage leading from one of said compartments to the interior of said chamber and a fluid passageway leading from said chamber to the other of said compartments; a valve in each of said passages; two individually operable snap mechanisms in the respective inlet and outlet compartments including actuating members operatively connected with said valves, respectively, said mechanisms each comprising, a camshaft operatively engaged with one of said valves, overcenter spring means for oscillating said camshaft by snap movement; and means operatively interconnecting said movable wall with the overcenter spring means of the respective snap mechanisms, the last mentioned means comprising, a forked rod having the stem thereof movable longitudinally by said piston, the tines of said rod extending into said compartments, respectively, and connected with said overcenter spring means, respectively.

4. In a fuel metering device, means forming a chamber, a wall movable in the chamber, means including separate inlet and outlet valve mechanisms for directing fuel to and from said chamber to oscillate said movable wall, and means for operating said inlet and outlet valve mechanisms comprising a slidably mounted rod extending into said chamber, said rod having two spaced abutments alternately engageable by said wall as the latter oscillates to effect movement of said rod alternately in opposite directions, one of said abutments comprising a sleeve threaded on said rod and extending outside said chamber with the said sleeve being rotatable relative to said rod to thereby vary the distance between said abutments, means externally of said chamber cooperating with said sleeve to convert reciprocating movement of the latter to arcuate oscillatory movement, a rotatable member supported externally of said chamber, and means operatively interconnecting said member and said movement converting means for producing unidirectional rotation of said member in response to arcuate oscillations of said motion producing means.

5. In a fuel metering device having a valve for controlling the flow of fuel through the meter and snap mechanism operatively connected with the valve and comprising in combination, a camshaft engaging the valve, said camshaft having angularly spaced stops thereon, a member movable in opposite directions and engageable with said stops to move said camshaft in opposite directions, a spring connected with said member and acting on said member to bias said member to one side or the other of a dead center position relative to said member, and means for moving said member against the action of said spring and through the dead center relationship, said means including spaced abutments against which said member engages in moving from said dead center relationship.

6. In a fuel metering device having a valve for controlling the flow of fuel through the meter and a snap mechanism operatively connected with the valve and comprising in combination, a camshaft engaging the valve, said camshaft having angularly spaced stops thereon, a lever movable in opposite directions and engageable with said stops to move said camshaft in opposite directions, a spring connected with said lever and acting on said lever to bias said lever to one side or the other of a dead center position relative to said lever, means for adjusting the angular position of said spring relative to said lever, and means for moving said lever against the action of said spring through the dead center relationship, said means including spaced abutments against which said lever engages in moving from said dead center relationship.

7. In a fuel metering device having a fluid reciprocable wall, a valve for controlling the flow of fuel through the meter and a snap mechanism operatively connected with the valve and comprising in combination, a camshaft engaging the valve, said camshaft having angularly spaced stops thereon, a lever pivoted on said camshaft and movable in opposite directions and engageable with said stops to move said camshaft in opposite directions, a spring connected with said lever and acting on said lever to bias said lever to one side or the other of a dead center position relative to said lever, and a member pivoted on said camshaft and having spaced stops for engaging said lever to provide a lost motion connection between said member and lever, said member being movable in opposite directions by the reciprocable meter wall for moving said lever against the action of said spring and through the dead center relationship.

8. In a fuel metering device having a valve for controlling the flow of fuel through the meter and a snap mechanism operatively connected with the valve and comprising in combination, a camshaft engaging the valve, said camshaft having angularly spaced stops thereon, a member movable in opposite directions and engageable with said stops to move said camshaft in opposite directions, a spring having one end connected with said member, a lever having its movable part connected with the other end of said spring to position said spring to bias said member to one side or the other of a dead center position relative to said member, means for moving said member against the action of said spring and through the dead center relationship, said means including spaced abutments against which said member engages in moving from said dead center relationship, and means for adjustably positioning said lever to change the angular relationship of said spring and member.

9. In a fuel metering device having a fluid reciprocable wall, a valve for controlling the flow of fuel through the meter and a snap mechanism operatively connected with the valve and comprising in combination, a camshaft engaging the valve, said camshaft having angularly spaced stops thereon, a member pivoted on said camshaft and movable in opposite directions about its pivot and engageable with said stops to move said camshaft in opposite directions, a spring having one end connected with said member and acting on said member to bias said member to one side or the other of a dead center position relative to said member, a lever pivoted on said camshaft and having the other end of said spring connected to the outer end thereof, means for adjusting the position of said lever about its pivot, and a second member pivoted on said camshaft and having spaced stops for engaging the first mentioned member to provide a lost motion connection between said members, said second member being movable in opposite directions by the reciprocable meter wall for moving the first mentioned member against the action of said spring and through the dead center relationship.

References Cited in the file of this patent

UNITED STATES PATENTS

| Number | Name | Date |
|---|---|---|
| 1,130,792 | Burton | Mar. 9, 1915 |
| 1,266,417 | Davis | May 14, 1918 |
| 1,505,306 | Bassler | Aug. 19, 1924 |
| 1,567,328 | Oishei | Dec. 29, 1925 |
| 1,637,850 | Bassler | Aug. 2, 1927 |
| 1,804,557 | Gould et al. | May 12, 1931 |
| 1,841,568 | Bradley | Jan. 19, 1932 |
| 2,014,664 | Nicholls | Sept. 17, 1935 |
| 2,191,700 | Stetson | Feb. 27, 1940 |
| 2,231,355 | Ashton et al. | Feb. 11, 1941 |
| 2,237,520 | Brubaker et al. | Apr. 8, 1941 |
| 2,265,508 | Blum | Dec. 9, 1941 |
| 2,268,898 | Pelouch | Jan. 6, 1942 |
| 2,281,126 | Willits | Apr. 28, 1942 |
| 2,601,848 | Dahlberg | July 1, 1952 |